United States Patent [19]
Ige et al.

[11] Patent Number: 6,085,194
[45] Date of Patent: Jul. 4, 2000

[54] SERVICE MANAGING APPARATUS, A DATABASE COLLATING METHOD FOR USE IN THE SERVICE MANAGING APPARATUS, AND A COMPUTER READABLE RECORDING MEDIUM STORING A DATABASE COLLATING PROGRAM THEREIN

[75] Inventors: Fumiyasu Ige; Tetsuo Mimura; Michiko Osawa, all of Yokohama, Japan

[73] Assignee: Fujitsu Limited, Kanagawa, Japan

[21] Appl. No.: 09/035,283

[22] Filed: Mar. 5, 1998

[30] Foreign Application Priority Data

Oct. 8, 1997 [JP] Japan .................................. 9-275995

[51] Int. Cl.[7] ...................................................... G06F 17/30
[52] U.S. Cl. ............................... 707/10; 707/1; 707/201; 707/6
[58] Field of Search .................................. 379/201, 220, 379/211, 92.02, 58, 5, 115, 112; 707/10, 1, 201, 6; 708/171; 709/219; 395/200; 455/158.5

[56] References Cited

U.S. PATENT DOCUMENTS

| | | | |
|---|---|---|---|
| 5,146,561 | 9/1992 | Carey et al. | 395/200 |
| 5,297,189 | 3/1994 | Chabernaud | 379/58 |
| 5,341,505 | 8/1994 | Whitehouse | 708/171 |
| 5,355,481 | 10/1994 | Sluijter | 707/1 |
| 5,448,632 | 9/1995 | Iyob et al. | 379/201 |
| 5,452,450 | 9/1995 | Delory | 707/1 |
| 5,566,235 | 10/1996 | Hertz | 379/201 |
| 5,610,841 | 3/1997 | Tanaka et al. | 709/219 |
| 5,628,011 | 5/1997 | Ahamed et al. | 707/10 |
| 5,696,809 | 12/1997 | Voit | 379/5 |
| 5,732,131 | 3/1998 | Nimmagadda et al. | 379/211 |
| 5,732,338 | 3/1998 | Schwob | 455/158.5 |
| 5,740,237 | 4/1998 | Malik et al. | 379/211 |
| 5,761,500 | 6/1998 | Gallant et al. | 707/10 |
| 5,793,852 | 8/1998 | Kang et al. | 379/115 |
| 5,806,075 | 9/1998 | Jain et al. | 707/201 |
| 5,809,119 | 9/1998 | Tonomura et al. | 379/112 |
| 5,838,774 | 11/1998 | Weisser, Jr. | 379/92.02 |
| 5,890,156 | 5/1999 | Rekieta et al. | 707/10 |
| 5,903,639 | 5/1999 | Lipchock et al. | 379/220 |

FOREIGN PATENT DOCUMENTS 7160562  6/1995  Japan .

*Primary Examiner*—Wayne Amsbury
*Assistant Examiner*—Thuy Pardo
*Attorney, Agent, or Firm*—Helfgott & Karas, PC

[57] ABSTRACT

A service managing apparatus for managing a state of a service controlling apparatus providing services in response to a request from an exchange has a request number reading unit for reading the number of requests for service supply from the exchange held by the service controlling apparatus, a database reading unit for reading contents of a database for service operation possessed by the service controlling apparatus, a collating unit for collating the read contents with contents in a corresponding region of a subscriber database, and a read control unit for controlling the reading of the contents of the database on the basis of the request number information read out by the request number reading unit, thereby periodically detecting normality of the databases in a network in service operation to prevent degradation of the services even if the number of transactions is increased.

6 Claims, 9 Drawing Sheets

FIG. 4

| THE UPPER LIMIT OF THE NUMBER OF TRANSACTIONS | THE LOWER LIMIT OF THE NUMBER OF TRANSACTIONS | THE NUMBER OF RECORDS TO BE READ OUT |
|---|---|---|
| 0 | 2 | 10000 |
| 2 | 5 | 8000 |
| 5 | 10 | 2000 |
| 10 | 20 | 500 |
| 20 | 30 | 32 |
| 30 | INFINITY | 0 |

FIG. 5

| SERVICE NAME | DATA TABLE NAME | DATA LABEL |
|---|---|---|
| FREEPHONE SERVICE | CUSTOMER_TBL | USAGE_COUNT |
| FREEPHONE SERVICE | CUSTOMER_TBL | INVALID_COUNT |
| CREDIT CARD CALLING SERVICE | CARD NO_TBL | USER_PIN |

FIG. 6

| SCP HOST NAME | ADDRESS | AVAILABLE SERVICE (1) | AVAILABLE SERVICE (2) | AVAILABLE SERVICE (3) |
|---|---|---|---|---|
| SCP-A | 199.30.20.1 | FREEPHONE SERVICE | VPN | NA |
| SCP-B | 199.30.20.2 | FREEPHONE SERVICE | ALTERNATE BILLING SERVICE | NA |
| SCP-C | 199.33.25.2 | ALTERNATE BILLING SERVICE | NA | NA |

23

SERVICE MANAGING APPARATUS, A DATABASE COLLATING METHOD FOR USE IN THE SERVICE MANAGING APPARATUS, AND A COMPUTER READABLE RECORDING MEDIUM STORING A DATABASE COLLATING PROGRAM THEREIN

BACKGROUND OF THE INVENTION (1) Field of the Invention

The present invention relates to a system for managing subscriber databases in an intelligent network (IN) and an advanced intelligent network (AIN) which are techniques of configuring a telephone communication network.

The intelligent network is proposed as a technique of introducing databases centralized in a telephone network and realizing various services.

(2) Description of Related Art

FIG. 10 is a diagram showing a configuration of an intelligent network invented heretofore. An intelligent network 100' shown in FIG. 10 is configured such that an SMS (Service Management System) 20' is connected to a plurality of SCPs (Service Control Points) 30'a and 30'b (two SCPs, for example, as shown in FIG. 10) in a lower hierarchy over an LAN (Local Area Network) or a packet switching network 60', and the SCPs 30'a and 30'b are connected to a plurality of SSPs (Service Switching Points) 50'-1 through 50'-3 in a further lower hierarchy over a NO. 7 common channel signalling network 40'.

Therefore, the intelligent network 100' is hierarchically configured with the SMS 20', the SCPs 30'a and 30'b, and the SSPs 50'-1 through 50'-3 mentioned above.

The SSPs 50'-1 through 50'-3 are nodes which determine necessity of a service processing by the intelligent network 100' during a switching/call processing performed when communication terminals communicate with each other, and access to the SCPs 30'a and 30'b performing predetermined service control.

Each of the SCPs 30'a and 30'b performs a processing for a free dial service such as number conversion to a free dial number, a credit card service, etc. in response to a request from the SSP 50'-1, 50'-2 or 50'-3. The SCPs 30'a and 30'b are connected to data bases 30'a-3 and 30'b-3, respectively.

Namely, the databases 30'a-3 and 30'b-3 collectively store data (service data) relating to services of the SCPs 30'a and 30'b, whereby the SCPs 30'a and 30'b handle an enormous volume of data stored in the respective databases 30'a-3 and 30'b-3 so as to provide various services as above.

Subscriber data held in the SCPs 30'a and 30'b differs from each other according to services provided by the SCP 30'a and 30'b. For instance, if contents of services made by the SCPs 30'a and 30'b shown in FIG. 10 differ from each other, the subscriber data (A and B, for example) held in the databases 30'a-3 and 30'b-3 of the respective SCPs 30'a and 30'b differ from each other. In response to an inquiry from the SSP 50'-1, 50'-2 or 50'-3, each of the SCPs 30'a and 30'b retrieves relevant subscriber data in the corresponding database 30'a-3 or 30'b-3, sends back a result of the retrieval to the SSP 50'-1, 50'-2 or 50'-3, thereby realizing a service.

The SMS 20' as a service management system manages the entire network relating to the intelligent network 100', at the same time, assists to provide the services, collectively manages an addition, an update, etc. of data in the databases possessed by the SCPs 30'a and 30'b. The SMS 20' has a database 20'-3. The database 20'-3 holds subscriber data for services provided by the SCPs 30'a and 30'b in the lower hierarchy of the SMS 20', in which subscriber data (A and B, for example) of the services provided by the SCPs 30'a and 30'b is held.

In the above configuration, when receiving a free dial connect request or the like from a subscriber terminal, the SSP 50'-1, 50'-2 or 50'-3 transmits a signal to convert a corresponding number to a predetermined SCP 30'a or 30'b. The SSP 50'-1, 50'-2 or 50'-3 performs a desired switching process by using a result of the number conversion received from the SCP 30'a or 30'b. When there is an access to the SCP 30'a or 30'b as above, the SCPs 30'a or 30'b updates the subscriber data managed therein.

In order to check matching of subscriber data managed in the SMS 20' and a plurality of the SCPs 30'a and 30'b, the database is periodically backed up in a time zone a traffic volume is small in each of the SCPs 30'a and 30'b, and compared and collated in another system.

However, it is necessary to periodically check the matching of the databases 30'a-3, 30'b-3 and 20'-3 in the network 100 under a state of service operation, in order to prevent a stop of the services of the entire network because of a breakdown of the databases 30'a-3 and 30'b-3 of the respective SCPs 30'a and 30'b while the services are operated.

Upon the matching check on the databases 30'a-3, 30'b-3 and 20'-3, since a large volume of the subscriber data in the databases 30'a-3 and 30'b-3 of the respective SCPs 30'a and 30'b is collated with the database 20'-3 of the SMS 20' within a short period, it is necessary to read the subscriber data as many as possible from the databases 30'a-3 and 30'b-3 of the respecive SCPs 30'a and 30'b to the SMS 20' and collate the subscriber data in the SMS 20'.

In the technique of collating the databases 30'a-3 and 30'b-3 of the respective SCPs 30'a and 30'b with the database 20'-3 of the SMS 20' as above, when a transaction processing from the SSPs 50'-1 through 50'-3 to the SCPS 30'a and 30'b burst out increasing while the collating processing on the subscriber data is carried out, a response processing on the SSPs 50'-1 through 50'-3 in response to the transaction processing is suppressed, which leads to degradation of the services.

SUMMARY OF THE INVENTION

In the light of the above problem, an object of the present invention is to provide a service managing apparatus which periodically checks normality of databases in a network under a state of service operation by changing a load of the process in the normality check on the basis of the number of requests for transaction process to keep subscriber data integrity during service operation, thereby maintaining a service quality.

The present invention therefore provides a service managing apparatus for managing a state of the service controlling apparatus for providing services accompanying a switching process in response to a request from an exchange performing the switching process when a communication is made between a plurality of terminals, the service managing apparatus having a subscriber database holding subscriber data for services provided by the service controlling apparatus, the service managing apparatus comprising a request number reading unit, a database reading unit, a collating unit and a read control unit.

The request number reading unit reads the number of requests for service supply from the exchange held by the service controlling apparatus. The database reading unit reads contents of a database for service operation possessed by the service controlling apparatus. The collating unit collates the contents of the database for service operation read out by the database reading unit with contents in a corresponding region of the subscriber database. The read control unit controls the reading of the contents of the database for service operation by the database reading unit on the basis of the request number information read out by the request number reading unit.

In the service managing apparatus according to this invention which has the subscriber database holding the subscriber data for the services provided by the service controlling apparatus to manage a state of the service controlling apparatus for providing the services accompanying a switching process in response to a request from an exchange performing the switching process when a communication is made between a plurality of terminals, the request number reading unit reads the number of requests for service supply from the exchange held by the service controlling apparatus, the read control unit controls a reading of contents of the database for service operation by the database reading unit on the basis of the request number information read out by the request number reading unit, and the collating unit collates the contents of the database for service operation read out by the database reading unit with contents in a corresponding region of the subscriber database, whereby a collating process can be efficiently performed on the database of the service controlling apparatus existing in a network without affecting on the services even if the number of inquiry requests from the exchange is increased in the service controlling apparatus in operation.

In the service managing apparatus according to this invention, the read control unit may so control as to change each time a read quantity of the contents of the database for service operation by the database reading unit on the basis of the request number information.

In the service managing apparatus according to this invention, the read control unit so controls as to change each time a read quantity of the contents of the database for service operation by the database reading unit on the basis of the request number information, so that it is possible to cope with a fluctuation in traffic and rationally perform the collating process without affecting on the services.

The service managing apparatus according to this invention may have a read information quantity table in which a quantity of information to be read out by the database reading unit is set in advance.

In which case, the read control unit changes each time a read quantity of the contents of the database for service operation on the basis of the request number information with reference to the read information quantity table.

The service managing apparatus according to this invention has the read information quantity table in which a quantity of information to be read out by the database reading unit is set in advance correspondingly to the request number information, and the read control unit changes each time a read quantity of the contents of the database for service operation on the basis of the request number information with reference to the read information quantity table. Therefore, it is possible to efficiently carry out the collating process on the database of the service controlling apparatus existing in the network without affecting on the services even if the number of inquiry request from the exchange is increased.

The service managing apparatus according to this invention may further have a collation excluded data holding unit for holding information relating to contents not to be collated by the collating unit, and a collation controlling unit for controlling the collating unit not to collate the contents held in the collation excluded data holding unit.

The service managing apparatus according to this invention has the collation excluded data holding unit and the collation controlling unit, wherein the collation excluded data holding unit holds information relating to contents not to be collated by the collating unit, and the collation controlling unit controls the collating unit not to collate the contents held in the collation excluded data holding unit. Consequently, when the contents of the subscriber data read out from the database is collated, the collation excluded data holding unit is retrieved and a check on data labels registered therein is omitted so that an unnecessary difference is prevented from being detected.

The present invention further provides a method for collating database for use in a service managing apparatus for managing a state of a service controlling apparatus for providing services accompanying a switching process in response to a request form an exchange performing the switching process when a communication is made between a plurality of terminals, the service managing apparatus having a subscriber database holding subscriber data for the services provided by the service controlling apparatus, the method comprising the steps of a request number reading step of reading the number of requests for service supply from the exchange held by the service controlling apparatus, a read quantity deciding step of deciding a read quantity of contents of a database for service operation on the basis of the request number information read out at the request number reading step, a database reading step of reading a read quantity decided at the read quantity deciding step of the contents of the database for service operation possessed by the service controlling apparatus, and a collating step of collating the contents of the database for service operation read out at the database reading step with contents in a corresponding region of the subscriber database.

The request number reading step is of reading the number of requests for service supply from the exchange held by the service controlling apparatus. The read quantity deciding step is of deciding a read quantity of contents of the database for service operation on the basis of the request number information read out at the request number reading step. The database reading step is of reading a read quantity decided at the read quantity deciding step of the contents of the database for service operation possessed by the service controlling apparatus. The collating step is of collating the contents of the database for service operation read out at the database reading step with contents in a corresponding region of the subscriber terminal.

According to this invention, in the method for collating database for use in a service managing apparatus having a subscriber database holding subscriber data for services provided by a service controlling apparatus, the number of requests for service supply from the exchange held by the service controlling apparatus is read out at the request number reading step, a read quantity of contents of a database for service operation is decided on the basis of the request number information read out at the request number reading step, a read quantity decided a the read quantity deciding step of the contents of the database for service operation possessed by the service controlling apparatus is read out at the database reading step, and the contents of the database for service operation read out at the database reading step is collated with contents in a corresponding region of the subscriber database at the collating step. Consequently, it is possible to efficiently carry out the collating process on the database of the service controlling apparatus existing in the network without affecting on the services even if the number of inquiry requests from the exchange is increased in the service controlling apparatus in operation.

The present invention still further provides a computer readable recording medium in which a database collating program is recorded characterized in that when databases are collated in a service managing computer having a subscriber database holding subscriber data for services provided by a service controlling apparatus to manage a state of the service controlling apparatus providing the services accompanying a switching process in response to a request from an exchange performing the switching process when a communication is made between a plurality of terminals, the database collating program makes said service managing computer function as a request number reading means for reading the number of requests for service supply from the exchange held by the service controlling apparatus, a read quantity deciding means for deciding a read quantity of contents of a database for service operation on the basis of the request number information read out by the request number reading means, a database reading means for reading a read quantity decided by the read quantity deciding means of the contents of the database for service operation possessed by the service controlling apparatus, and a collating means for collating the contents of the database for service operation read out by the database reading means with contents in a corresponding region of the subscriber database.

In the computer readable recording medium according to this invention in which a database collating program is recorded, the program makes the service managing computer execute functions as the request number reading means, the read quantity deciding means, the database reading means and the collating means. Consequently, it is possible to efficiently carry out the collating process on the database of the service controlling apparatus existing in the network without affecting on the services even if the number of inquiry requests from the exchange is increased in the service controlling apparatus in operation.

BRIEF DESCRIPTION OF THE DRAWINGS

FIG. 4 is a diagram showing an SCP capacity data holding unit according to the embodiment of this invention;

FIG. 5 is a diagram showing a collation excluded data holding unit according to the embodiment of this invention;

FIG. 6 is a diagram showing an SCP classified data holding unit according to the embodiment of this invention;

DESCRIPTION OF THE PREFERRED EMBODIMENTS (a) Description of an Embodiment of the Invention Hereinafter, description will be made of an embodiment of this invention with reference to the drawings.

Figure 1:
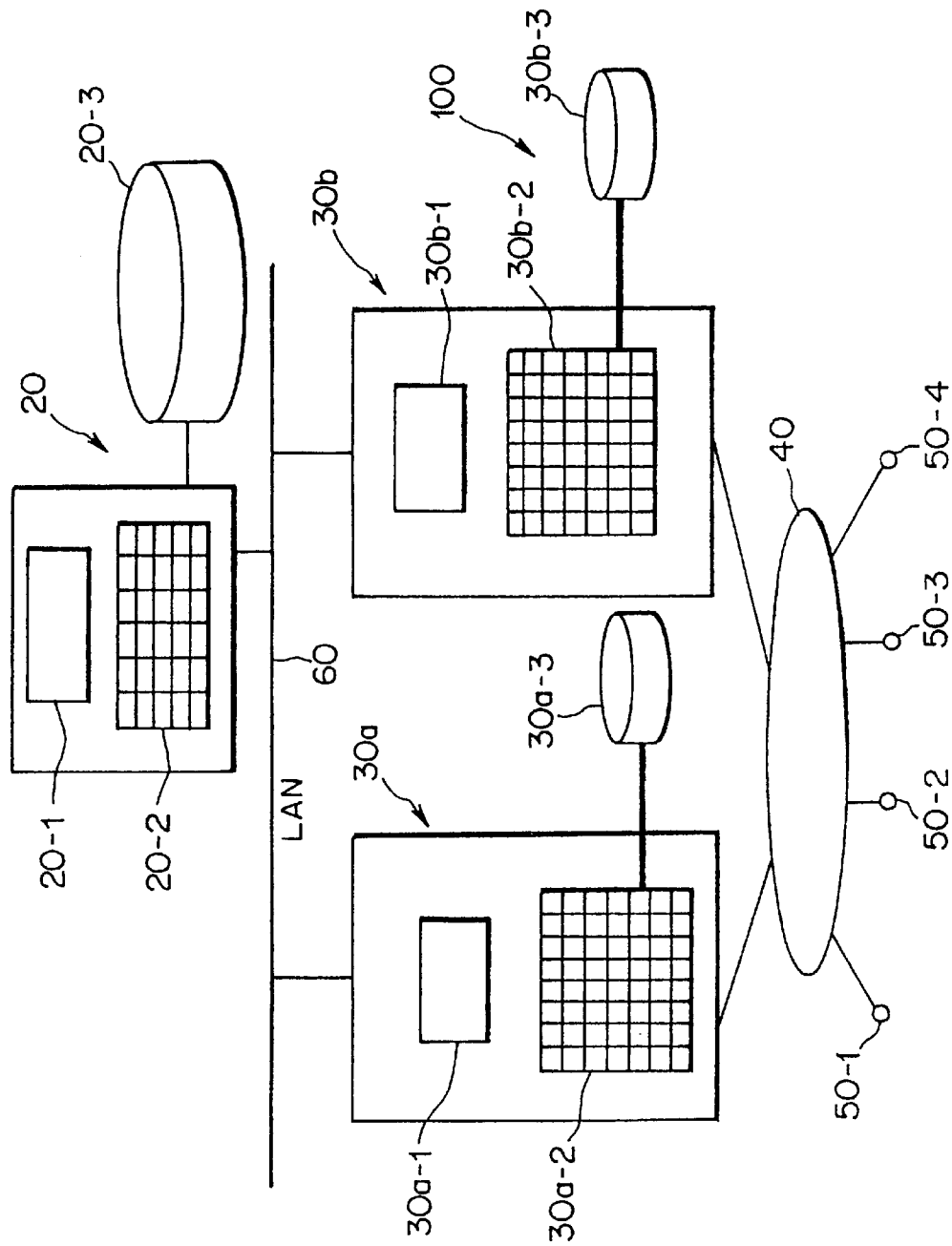
FIG. 1 is a diagram showing an intelligent network to illustrate a service managing apparatus according to an embodiment of this invention.

FIG. 1 is a diagram showing an intelligent network 100 to illustrate a service managing apparatus 20 according to an embodiment of this invention. In FIG. 1, reference numerals 50-1 through 50-4 are SSPs as exchanges. When receiving a service request signal for free dial or the like from a subscriber terminal, each of the SSPs 50-1 through 50-4 requests for a corresponding number conversion or the like of a predetermined SCP, the SSPs 50-1 through 50-4 being connected to a plurality (two, for example) of SCPs 30a and 30b over a NO. 7 common channel signalling network 40.

Each of the SCPs 30a and 30b determines necessity of a service processing while performing a switching/call processing upon a communication between communication terminals, and performs a predetermined service control. For instance, each of the SCP 30a and 30b can provide various telephone services such as a free dial service, a credit card service and the like to subscribers in a lower hierarchy of the SSPs 50-1 through 50-4.

Each of the SCPs 30a and 30b can perform processes of providing services at the same time in response to service requests from a plurality of the SSPs 50-1 through 50-4.

Reference numeral 20 denotes the SMS as a service managing apparatus. The SMS 20 manages an entire network relating to the intelligent network 100, and, at the same time, collectively manages support for service providing, and an addition, an update, etc., of subscriber data held in the SCPs 30a and 30b, which is connected to each of the SSPs 30a and 30b over an LAN 60.

Each of the SCPs 30a and 30b counts the number of requests for various telephone number services as above from the SSPs 50-1 through 50-4.

The SMS 20, and the SCPs 30a and 30b have, as concrete hardware, central processing units (CPUs) 20-1, 30a-1, 30b-1, memory management units (MMUs) 20-2, 30a-2 and 30b-2, and databases 20-3, 30a-3 and 30b-3, respectively. The CPUs 20-1, 30a-1 and 30b-1 control respective hardware upon predetermined processings. In each of the databases 20-3, 30a-3 and 30b-3, there is stored subscriber data of the services.

In the database 20-3 of the SMS 20 accommodating the SCPs 30a and 30b via the LAN 60, there is stored contents of all subscriber data of the services which can be provided by the SCPs 30a and 30b. On the other hand, in each of the databases 30a-3 and 30b-3 of the respective SCPs 30a and 30b, there is stored subscriber data for services which can be provided by each of the SCPs 30a and 30b.

If the services which can be provided by the SCP 30a differ from the services which can be provided by the SCP 30b, the subscriber data stored in the databases 30a-3 and 30b-3 of the SCPs 30a and 30b differ from each other.

Processings of various telephone services, a process of counting the number of requests (measurement of the number of transactions, described later) in the above SCPs 30a and 30b, and management of the SCPs 30a and 30b by the SMS 20 are realized by executing software in the CPUs 20-1, 30a-1 and 30b-1. The CPUs 20-1, 30a-1, 30b-1 and the like of the SMS 20 and the SCPs 30a and 30b mainly execute programs to perform controls on hardware.

For instance, each of the CPUs 30a-1 and 30b-1 of the SCPs 30a and 30b executes various programs loaded in the corresponding storage 30a-2 or 30b-2, thereby fetching data for providing a service corresponding to an inquiry from the SSP 50-1, 50-2, . . . or 50-4 from the corresponding database 30a-3 or 30b-3, sending back the data to the SSP 50-1, 50-2, . . . or 50-4 which has made the request, thereby providing the service.

Similarly, the CPU 20-1 of the SMS 20 executes a program loaded in the storage 20-3 to perform subscriber data management such as a subscriber data collating process and the like when managing the subscriber data. The SMS 20 performs a process of examining matching of the subscriber data for services which can be provided by the SCPs 30a and 30b stored and held by the database 20-3 of itself (SMS 20) with the subscriber data held by the SCPs 30a and 30b.

Figure 2:
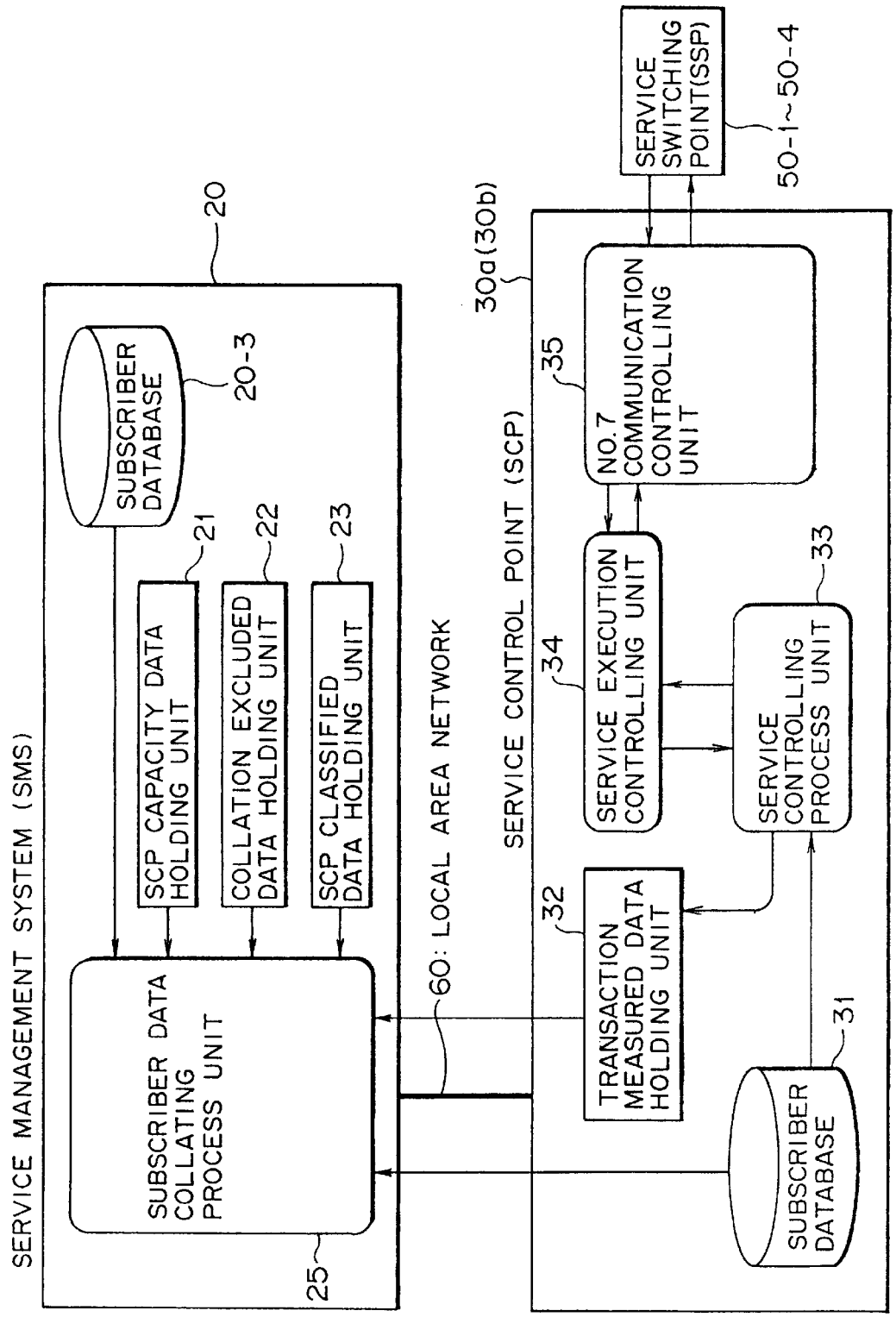
FIG. 2 is a block diagram showing an SMS and an SCP according to the embodiment of this invention.

FIG. 2 is a block diagram showing the SMS 20, and the SCPs 30a and 30b according to the embodiment of this invention. As shown in FIG. 2, the SCP 30a (30b) has a NO. 7 communication controlling unit 35, a service execution controlling unit 34, a service controlling process unit 33, a transaction measured data holding unit 32, and a subscriber database 31 (corresponding to 30a-3 or 30b-3). Incidentally, description will be hereinafter made, paying an attention to only the SCP 30a, since the SCPs 30a and 30b have the same structure.

The NO. 7 communication controlling unit 35 exchanges signals with the SSPs 50-1 through 50-4. The service controlling process unit 33 executes a transaction process on a service request signal from a user, besides measuring the number of accesses to the database 31 within a predetermined period to set the number of transactions, as will be described later.

The transaction measured data holding unit 32 holds the number of transactions measured. Measuring of the number of accesses as above is controlled by software. The CPUs 30a-1 and 30b-1 of the SCPs 30a and 30b mainly execute the software to control other hardware (not shown).

The service execution controlling unit 34 corresponds to an operating system, which controls on execution of a program. The service controlling process unit 33 corresponding to, so to speak, an application.

Measuring of the number of transactions in the SCP 30a will be next described. When the SCP 30a receives a service request signal from the SSP 50-1, 50-2, . . . or 50-4 via the NO. 7 communication controlling unit 35, the service controlling unit 34 performs a software control and the service controlling process unit 33 executes the transaction process correspondingly thereto. In the course of a service executing process, transaction measured data is obtained on the basis of accesses to the subscriber database 31 and held.

Figure 3:
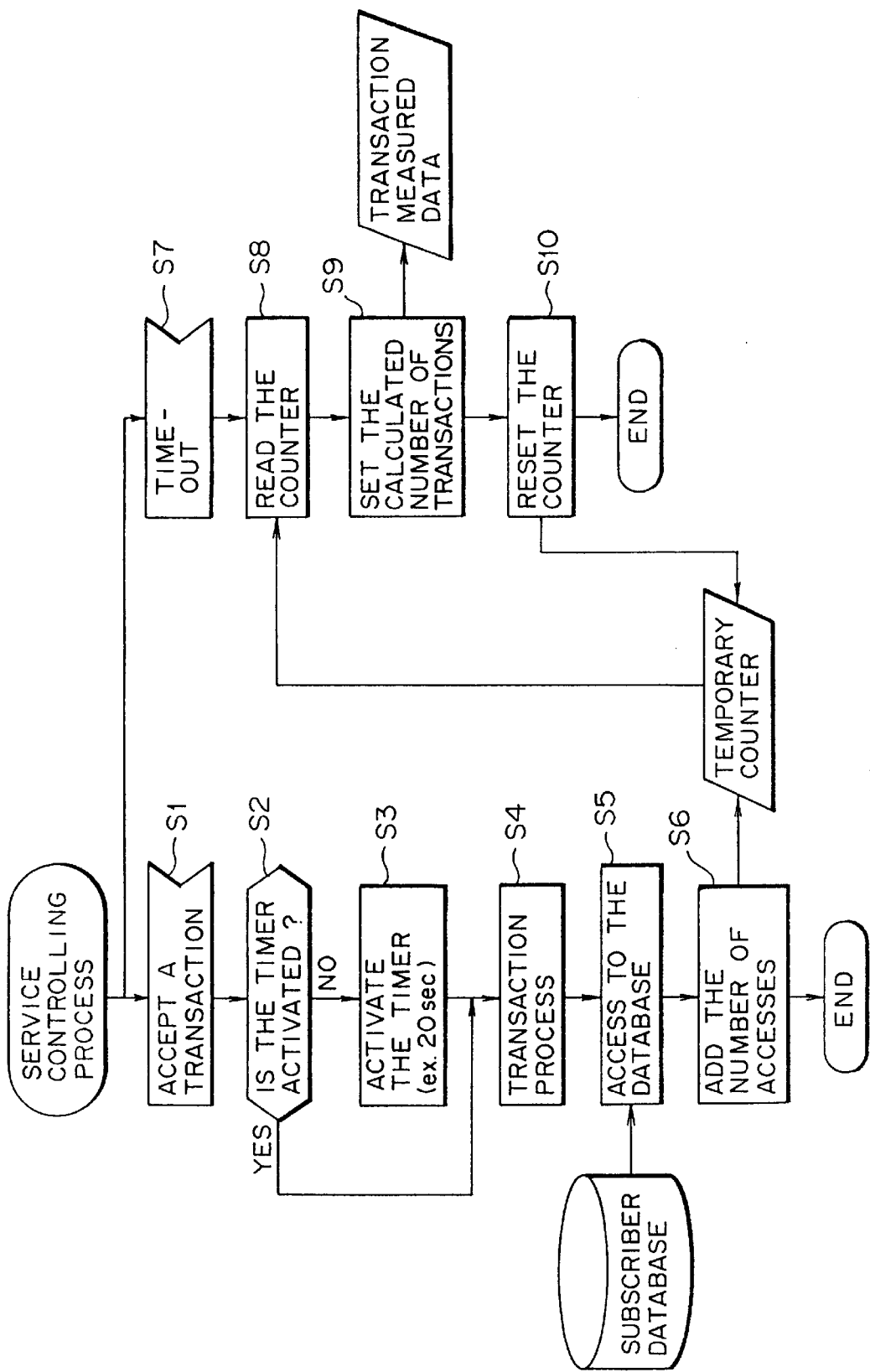
FIG. 3 is a flowchart for illustrating steps of measuring the number of transactions per unit time according to the embodiment of this invention.

FIG. 3 is a flowchart for illustrating steps of measuring the number of transactions per unit time (obtaining the transaction measured data).

As shown in FIG. 3, when the service controlling process unit 33 receives a service request signal from a user in a state of waiting for a request signal from a user of the service (Step S1; reception of a transaction), the service controlling process unit 33 determines whether or not a timer (not shown) for measuring the number of transactions within a predetermined period is activated (Step S2).

If the timer is not activated, the service controlling process unit 33 activates the timer (Step S3). The timer is used to measure a period for which the number of transactions accepted by the above service controlling process unit 33 is measured. If the measured period by the timer is 20 seconds, for example, the service controlling process unit 33 can measure the number of transactions at intervals of 20 seconds (hereinafter, description will be made, assuming the timer is of 20 seconds).

The service controlling process unit 33 executes the transaction process in response to the service request signal from the user (Step S4). In the course of the transaction process, an access is had to the subscriber database 31 (Step S5).

Namely, in the course of execution of the transaction process, the service controlling process unit 33 accesses to the subscriber database 31 in response to the service request signal from the user to refer to the service subscriber data. Here, the number of accesses to the subscriber database 31 in the course of execution of the process on one transaction is not always once, but possibly plural.

The service controlling process unit 33 measures the number of accesses, addes the measured number to the number of access having been had (Step S6), and temporarily stores data of the added number of accesses in a temporary counter provided in a predetermined region in the memory.

When the timer becomes time-out (Step S7), the service controlling process unit 33 reads the number of accesses to the subscriber database 31 for 20 seconds stored in the temporary counter (Step S8), calculates the number of accesses per unit time from the number of accesses read out, then sets a result of the calculation as the transaction measured data in the transaction measured data holding unit 32 (Step S9).

After that, the service controlling process unit 33 resets the data of the number of accesses stored in the temporary counter (Step S10).

As shown in FIG. 2, the SMS 20 has a subscriber database 20-3, an SCP capacity data holding unit 21, a collation excluded data holding unit 22, an SCP classified data holding unit 23 and a subscriber data collating process unit 25.

The SCP capacity data holding unit 21 holds information on a predetermined quantity of the subscriber data to be read out from the subscriber database 31 of the SCP 30a (30b), correspondingly to the number of transactions held as request (service request) number information in the transaction measured data holding unit 32 of each of the SCP 30a and 30b. The collation excluded data holding unit 22 holds information on subscriber data to be excluded from an object of a collating process when the SMS 20 collates the subscriber data with the subscriber data of the SCP30a or30b. The SCPclassified data holding unit 23 holds information on services available in each of the SCP 30a and 30b.

FIG. 4 is a diagram showing SCP capacity data held in the SCP capacity data holding unit 21. In the SCP capacity data holding unit 21, there is set a quantity of the subscriber data which can be read out by the SMS 20 according to the number of transactions in the SCP 30a, as shown in FIG. 4. If the SCP 30a-1 corresponds to the SCP capacity data as shown in FIG. 4, a quantity of the subscriber data to be read out by the SMS is 500 when the number of transactions is 15.

FIG. 5 shows collation excluded data held in the collation excluded data holding unit 22. As the collation excluded data, as shown in FIG. 5, there are data (Usage Count) showing the number of times of execution of freephone service in a freephone service, count data (Invalid Count) showing the number of times of occurrence of that a telephone call has not been put through to a service subscriber although there has been a request signal for the freephone service from a user, and a password (User PIN) of a credit card in a credit card calling service.

The usage count corresponds to the collation excluded data since the data changes each time the service is executed. The password of a credit card corresponds to the collation excluded data since it is changed or the like. The SCP classified data held in the SCP classified data holding unit 23 has a structure as shown in FIG. 6, for example.

The data shown in FIGS. 4 through 6 is used when the SMS 20 executes the data collating process.

The subscriber data collating process unit 25 reads the subscriber data on the basis of the transaction measured data held in the transaction measured data holding unit 32 of the SCP 30a, the SCP capacity data and SCP classified data, refers to the collation excluded data 22 and the like, and performs the collating process in order to establish matching of the subscriber data of the SMS 20 with the subscriber data of the SCP 30a.

Figure 7:
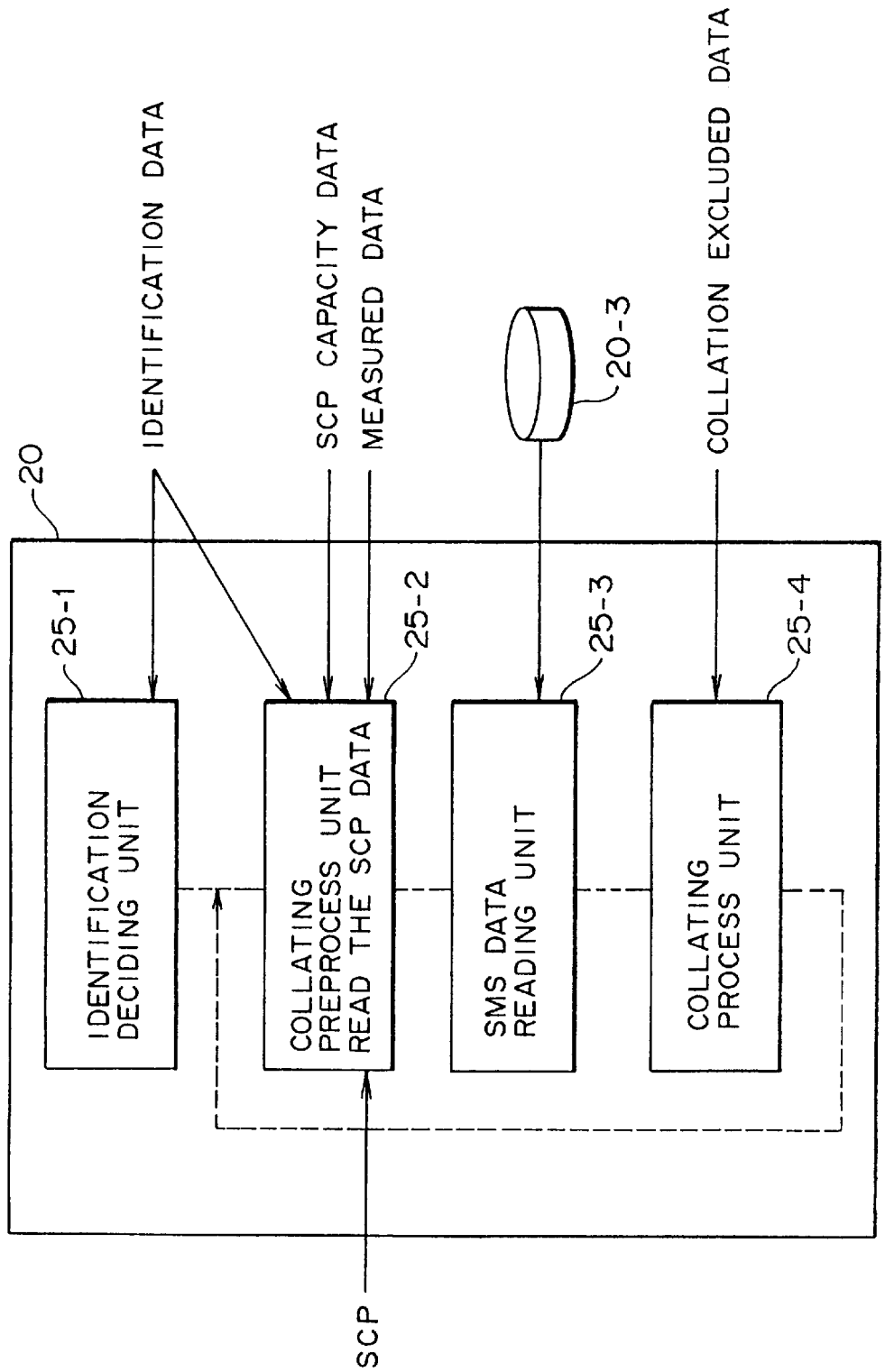
FIG. 7 is a block diagram for illustrating functions of a subscriber data collating process unit of the SMS according to the embodiment of this invention.

FIG. 7 is a block diagram for illustrating functions of the subscriber data collating process unit 25 of the SMS 20 according to the embodiment of this invention. As shown in FIG. 7, the subscriber data collating process unit 25 functionally has an identification deciding unit 25-1, a collating preprocess unit 25-2, an SMS data reading unit 25-3 and a collating process unit 25-4, functions of which are realized by executing a program loaded in the memory 20-2 by the CPU 20-1 of the SMS 20.

The identification deciding unit 25-1 decides the SCP 30a or 30b which is an object of the collating process for confirming matching of the subscriber data. The identification deciding unit 25-1 refers to identification data when deciding the SCP 30a or 30b which will be an object. Here, data showing which service is provided by each of the SCPs 30a and 30b (data held in the SCP classified data holding unit 23 and the like) corresponds to the identification data.

The collating preprocess unit 25-2 as a database reading unit reads the subscriber data from the SCP 30a or 30b which is an object of the collation decided by the identification deciding unit 25-1. In concrete, when reading the data from the SCP 30a, the collating preprocess unit 25-2 fetches the capacity data (data held in the SCP capacity data holding unit 21) and the measured data of the SCP 30a held in the SCP capacity data holding unit 21 and the collation excluded data holding unit 22, respectively, besides fetching the subscriber data stored in the transaction measured data holding unit 32 of the SCP 30a.

The measured data is data of the number of transactions per unit time in the SCP 30a or 30b, which is measured by the SCP 30a or 30b by itself. The measured data is read out by the collating preprocess unit 25-2.

Namely, the collating preprocess unit 25-2 plays a role as a request detection reading unit for reading the number of requests for service supply from the SPSs 50-1 through 50-4 held in the SCPs 30a and 30b.

As to a quantity of the sbuscriber data to be read out from the database 30a-3 of the SCP 30a by the SMS 20, the SMS 20 performs a read control such that the collating preprocess unit 25-2 reads the number of transactions measured by the SCP 30a, refers to the SCP processing capability data, and reads the subscriber data corresponding to the number of transactions from the database 30a-3 of the SCP 30a. A quantity of the subscriber data to be read out from the SCP 30a is decided according to the SCP capacity data held in the SCP capacity data holding unit 21.

Accordingly, the collating preprocess unit 25-2 reads the measured data, and decides a quantity of the subscriber data to be read out from the SCP 30a (30b), on the basis of the measured number of transactions and by referring to the SCP capacity data holding unit 21.

The collating preprocess unit 25-2 plays a role as a read control unit for controlling a reading of contents of the database 30a-3 (that is, a quantity of read data) on the basis of information on the transaction measured data read out from the SCP 30a by the request number reading unit.

The SMS data reading unit 25-3 reads the subscriber data, which is an object of the collation on the subscriber data read out from the SCP 30a, from the database 20-3 of the SMS 20.

The collating process unit 25-4, as a collating unit, detects whether or not there is a difference between the subscriber data read out from the database 30a-3 and 30b-3 and the subscriber data read out from the database 20-3. When performing the collating process, the collating process unit 25-4 refers to the collation excluded data holding unit 22, and does not perform the process of collating the subscriber data and detecting a difference on the excluded data.

The SMS 20 has the collation excluded data holding unit 22 for holding data on which the collation is not performed by the collating process unit 25-4 as the collating unit. The collating process unit 25-4 has a function as a collation control unit of abbreviating the collating process.

When detecting a difference, the collating process unit 25-4 notifies a maintenance person of the apparatus of it.

Conditions and the like under which the SMS 20 starts such the collating process are set in advance by the maintenance person of the apparatus. If there is set that the collating process is started at seven o'clock, for example, the collating process is started by that it is past seven, as a trigger.

The collating preprocess unit 25-2 of the SMS 20 does not read, at a time, all the subscriber data stored in the database 30a-3 of the SCP 30a used when the collating preprocess unit 25-2 executes the collating process, but determines the number of data to be read out on the basis of the number of transactions per unit time of the SCP 30a and by referring to the SCP capacity data, and reads the subscriber data from the database 30a-3 of the SCP 30a.

The SCP 30a measures the number of transactions using the number of accesses to the database 30a-3 with execution of the transaction process in response to a request for service from a user.

With the above structure, the service control process unit 33 receives an inquiry for a service request from the SSP 50-1, 50-2, . . . or 50-4 via the NO. 7 communication controlling unit 35 and the service execution controlling unit 34 of the SCP 30a. The service controlling process unit 33 reads information on a corresponding subscriber from the subscriber database 31, and responds to the service execution controlling unit 34. At this time, the service controlling process unit 33 measures the number of accesses to the subscriber database per unit time, and the transaction measured data holding unit 32 holds the number of transactions.

Figure 8:
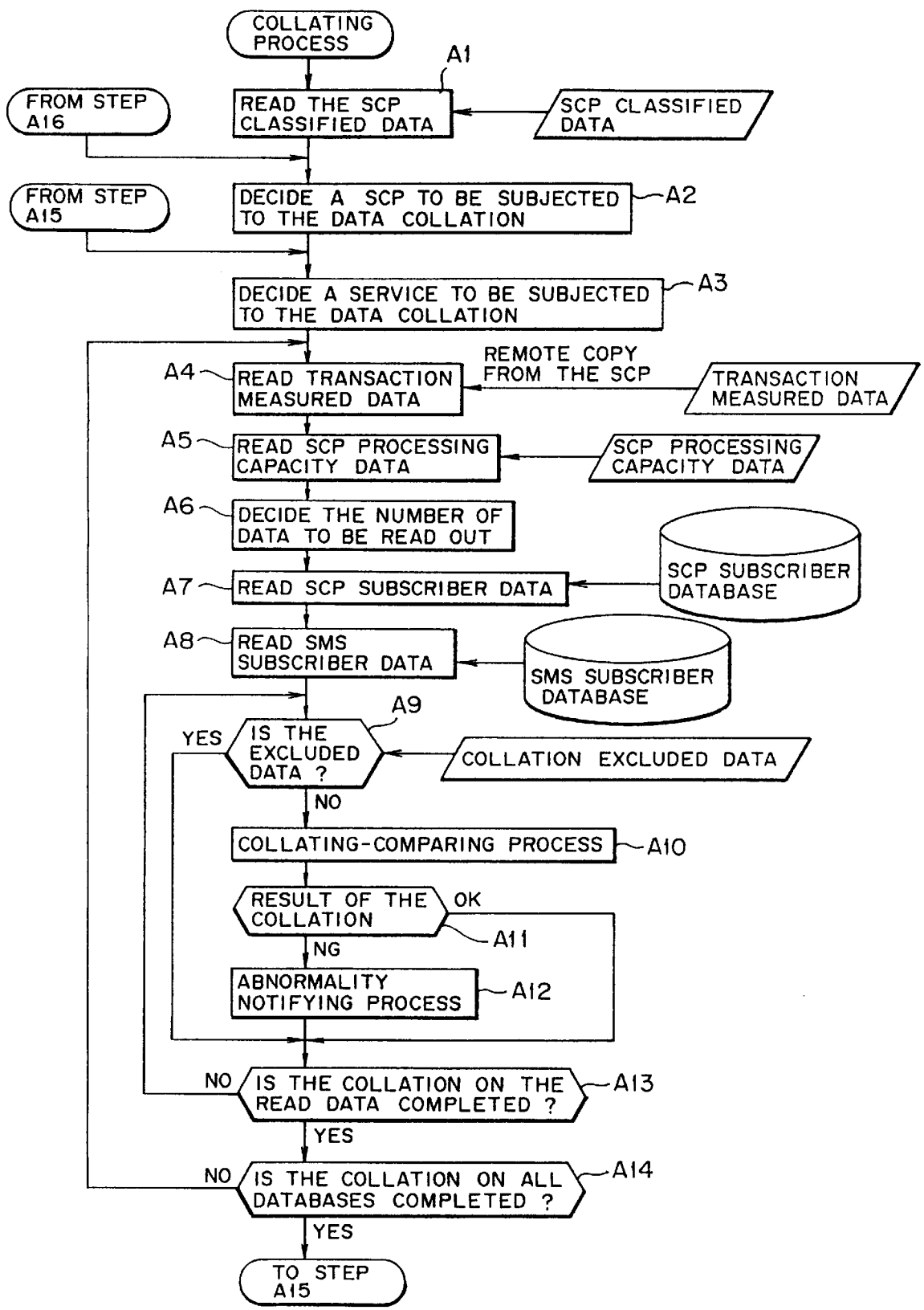
FIG. 8 is a flowchart for illustrating steps of a collating process according to the embodiment of this invention.
Figure 9:
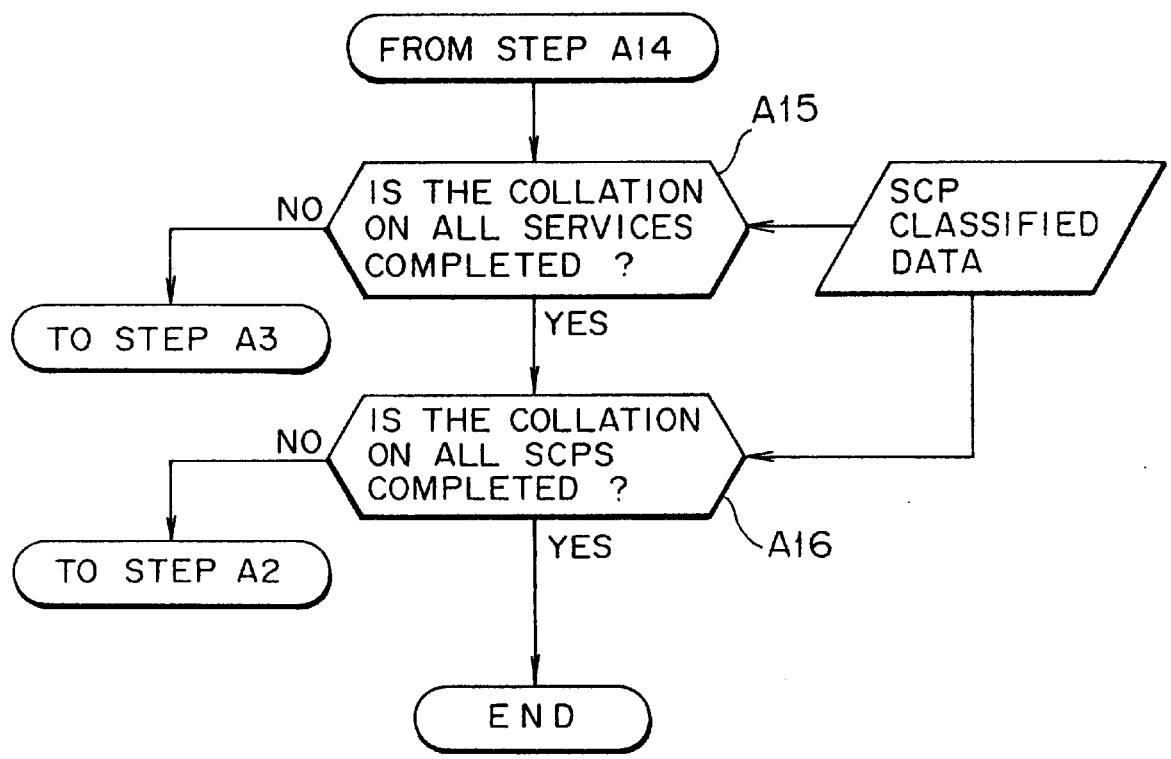
FIG. 9 is a flowchart for illustrating the steps of the collating process according to the embodiment of this invention.
Figure 10:
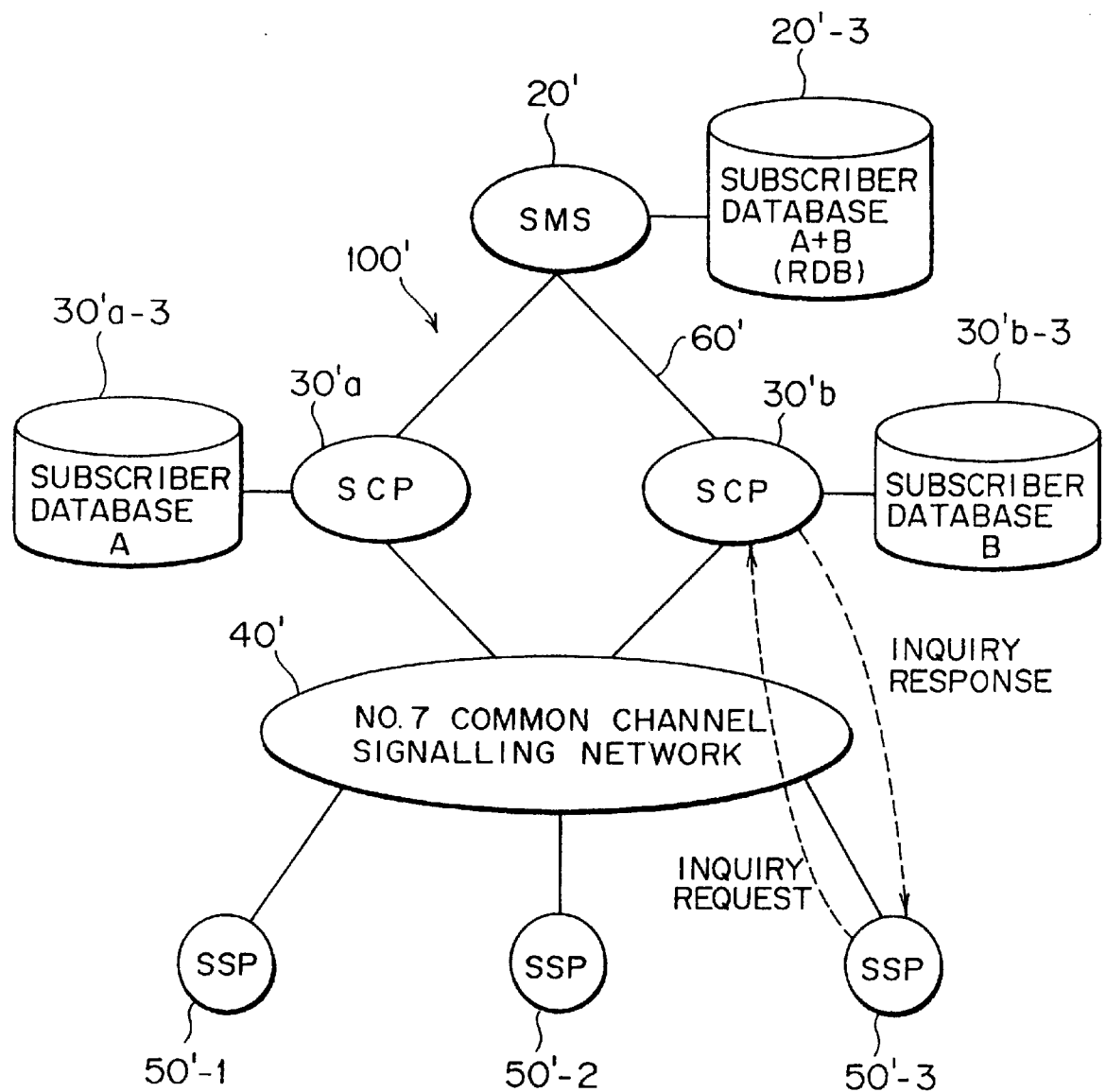
FIG. 10 is a diagram showing a structure of an intelligent network invented heretofore.

FIGS. 8 and 9 are flowcharts (Steps A1 through A16) for illustrating steps of the collating process. Referring to FIGS. 8 and 9, description will be next made of an operation and the like in a transaction measuring process.

In the subscriber data collating process unit 25 of the SMS 20, the identification deciding unit 25-1 first refers to the SCP classified data holding unit 23 when collating the subscriber data, reads the SCP classified data in the SCP classified data holding unit 23 (Step A1), decides the SCP 30a or 30b whose subscriber data is going to be collated (Step A2), and decides which service among the services available in the SCP 30a or 30b will be an object of the collating process on the basis of the SCP classified data of the SCP classified data holding unit 23 (Step A3).

The collating preprocess unit 25-2 as a request number reading means reads the transaction measured data 32 of the SCP 30a which is an object of the collating process from the SCP 30a (a request number reading step A4), and reads the processing capacity data of the SCP 30a which is an object of the collating process from the SCP capacity data holding unit 21 (Step A5) The collating preprocess unit 25-2 as a read quantity deciding means decides a rate of the subscriber data (the number of the data) to be read out from the database 31 of the SCP 30a (a read quantity deciding step A6). On the basis of the decided rate, the collating preprocess unit 25-2 as a database reading means reads a data group from the database 31 of the SCP (a database reading step A7).

The SMS data reading unit 25-3 reads the subscriber data which is an object of the collation from the database 20-3 (Step A8).

The collating process unit 25-4 performs the collating process on each of the subscriber data groups (plural subscriber data) read out from the database 31 of the SCP 30a, as below.

The collating process unit 25-4 refers to the collation excluded data holding unit 22 to determine whether or not the subscriber data corresponds to the excluded data (Step A9).

When the subscriber data corresponds to the excluded data, the collating process unit 25-4 does not perform the collating process on the subscriber data, and proceeds to Step A13.

The SMS 20 functions as a collation controlling unit for controlling collation by the collating process unit 25-4 on the basis of the collation excluded data held in the collation excluded data holding unit 22 as information relating to contents on which the collation is not performed by the collating process unit 25-4.

On the other hand, when the subscriber data does not correspond to the excluded data, the collating process unit 25-4 as a collating means determines whether or not the subscriber data coincides with the subscriber data stored in the database 20-3 of the SMS 20 (collating steps A10 and A11).

When it is found from a result of the collation that there is a difference or the like between the subscriber data read out from the database 31 of the SCP 30a and the subscriber data stored in the database 20-3 of the SMS 20, an abnormal notifying process of sending an alarm signal to the maintenance person or the like of the apparatus is performed (Step A12), after that, it is determined whether or not the collating steps A10 and A11 have been performed on all subscriber data groups read out from the database 31 of the SCP 30a on the basis of the read quantity deciding step A6.

If the collating process has not yet been performed on all the subscriber data read out at the database reading step A7, the collating process unit 25-4 performs the collating process on the remaining subscriber data (Steps A9, A10 and A11). If the collating process has been performed on all the subscriber data read out, it is determined whether or not the collation on all the subscriber data of the service is completed (Step A14).

If there remains subscriber data of the service other than the subscriber data on which the collating process has been performed in the SCP 30a, the subscriber data collating process unit 25 performs the processes at the steps A4 through A13, that is, the data reading steps by the collating preprocess unit 25-2 and the data reading unit 25-3 of the SMS 20, and the processes by the collating process unit 25-4, etc., in order to perform the collating process on the remaining subscriber data. Since the request number reading step and the read quantity deciding step are newly performed when the remaining subscriber data is read out, the SMS 20 functions to control the collating preprocess unit 25-2 to change each time a read quantity of contents of the subscriber database 30a-3 on the basis of the number of transactions per unit time.

The collating preprocess unit 25-2 decides a read quantity of the subscriber data from the SCP 30a and 30b through the above request number reading step and the read quantity deciding step with reference to the SCP capacity data holding unit 21 shown in FIG. 4. At this time, the read quantity is appropriately changed each time the subscriber data is read out.

The SMS 20 functions to change each time a quantity of the subscriber data to be read out from the database 30a-3 of the SCP 30a by the collating preprocess unit 25-2 by referring to the SCP capacity data of the SCP capacity data holding unit 21 set in advance according to the number of transactions.

When the collating process is completed on all the subscriber data of one service, the subscriber data collating process unit 25 determines whether or not the collating process is completed on all services available in the SCP 30a (Step A15).

If another service is available in the SCP 30a, the subscriber data collating process unit 25 executes the processes at the above Steps A3 through A14 on the remaining service.

When the process of collating the subscriber data of the services available in one SCP 30a is completed, the subscriber data collating process unit 25 determines whether or not the collating process on all the SCPs 30a and 30b connected to the SMS 20 and the LAN 60 is completed (Step A16).

The subscriber data collating process unit 25 executes the processes at the above Steps A2 through A15 on the SCP 30b not having been subjected to the collating process.

When the process of collating the subscriber data of all the SCPs 30a and 30b is completed, the subscriber data collating process unit 25 terminates the collating process.

In the subscriber data collating process unit 25 of the SMS 20, the identification deciding unit 25-1 successively requests for reading of the database from the SCPs registered in the SCP classified data holding unit 23, the collating preprocess unit 25-2 decides the number of records to be read on the basis of the transaction measured data read out from the SCPs 30a and 30b and the SCP capacity data in the SCP capacity data holding unit 21 and reads out the subscriber data from the subscriber database 31, the SMS data reading unit 25-3 reads an object of comparison, and the collating process unit 25-4 carries out the comparison and collation to detect or the like a difference in the data.

When comparing and collating contents of the record read out from the subscriber database 31, the collating process unit 25-4 retrieves in the collation excluded data holding unit 22, and omits a check on data labels registered in the collation excluded data holding unit 22.

According to the SMS 20 of this embodiment, the collating preprocess unit 25-2 reads the number of transactions stored in the transaction measured data holding unit 32 and controls reading of the subscriber data on the basis of the number of transactions, and the collating process unit 25-4 collates the subscriber data read out under the control with the subscriber data read out by the SMS data reading unit 25-3. Consequently, it is possible to effiently carry out the collating process on the database 31 of the SCP 30a existing in the network without affecting on the services even if the number of inquiry requests from the SSPs 50-1 through 50-4 is increased or decreased in the SCPs 30a and 30b in operation.

The collating preprocess unit 25-2 changes each time a quantity of data to be read out from the subscriber database 31 of the SCP 30a on the basis of the number of transactions so that it is possible to cope with a change in traffic and rationally carry out the collating process without affecting on the services.

The SMS 20 has the SCP capacity data holding unit 21 in which a quantity of data to be read out from the subscriber database 31 is set in advance according to the number of transactions, and the collating preprocess unit 25-2 changes each time a read quantity of contents stored in the subscriber database 31 on the basis of the number of transactions and by referring to the SCP capacity data holding unit 21. Accordingly, it is possible to efficiently carry out the collating process on the database of the SCP 30a existing in the network without affecting on the services even if the number of inquiry requests from the SSPs 50-1 through 50-4 is increased or decreased.

Further, when comparing and collating contents of the subscriber data read out from the database 20-3 in the collating process, the SMS 20 retrieves in the collation excluded data holding unit 22 and omits the collating process on corresponding subscriber data in the collation excluded data holding unit 22, thereby avoiding detection of an unnecessary difference between the database 20-3 of the SMS 20 and the database 31 of the SCP 30a.

When the database 31 is collated with the database 20-3 in the SMS 20 which manages a state of the SCP 30a providing the service in response to service requests from the SSPs 50-1 through 50-4 which perform switching when a communication is made between a plurality of terminals, the SMS 20 executes the request number reading step, the read quantity deciding step, the database reading step and the collating step. Accordingly, it is possible to efficiently carry out the collating process on the databases of the SCP 30a existing in the network without affecting on the services even if the number of inquiry requests from the SSPs 50-1 through 50-4 is increased or decreased in the SCP 30a in operation.

In the course of detecting a differece in the subscriber data by the SMS 20, the CPU 20-1 performs a controlling process or an executing process on it, as described above. In order to realize such various functions, a program for realizing the various function is read out from a recording medium to be loaded in the memory 20-2, thereby performing controls or the like on various hardware.

The program recorded in the recording medium is a database collating program for making a computer of the SMS 20 function as a request number reading means for reading the number of requests for service supply from the SSPs 50-1 through 50-4 held by the SCP 30a, a read quantity deciding means for deciding a read quantity of contents of the database 30a-3 in service operation on the basis of the request number information read out by the request number reading means, a database reading means for reading a read quantity decided by the read quantity deciding means of the contents of the database 30a-3 in service operation possessed by the SCP 30a, and a collating means for collating the contents of the database 30a-3 in service operation read out at the database reading step with contents in a corresponding region 20-3 of the subscriber database, when the SMS 20 having the subscriber database 20-3 holding the subscriber data of the services by the SCP 30a collates the databases 20-3 with the database 30a-3 in order to manage a state of the SCP 30a providing the services accompanying a switching process in response to service requests from the SSPs 50-1 through 50-4 performing a switching when a communication is made between a plurality of terminals.

(b) Others

The above (a) has been described, employing the number of accesses to the database 30a-3 per unit time as the transaction measured data, two SCPs 30 as elements of the intelligent network 100, etc. However, various modifications are possible within a scope of the present invention.

What is claimed is:

1. A service managing apparatus, adapted to constitute a part of an intelligent network, for managing a state of a service controlling apparatus in the intelligent network, for providing service in response to a desired request from an exchange that performs the switching process when communications are made between a plurality of terminals, which are adapted to be communicatably connected to the intelligent network, said service managing apparatus comprising:

a subscriber database holding subscriber data for the service provided by said service controlling apparatus, said service managing apparatus comprising:
a request quantity reading unit for reading the quantity of requests for service supply from said exchange held by said service controlling apparatus;
a database reading unit for reading contents of an operating database for service operation possessed by said service controlling apparatus;
a collating unit for collating the contents of said operating database read out by said database reading unit with contents in a corresponding region of said subscriber database in order to check the matching of said operating database and said subscriber database; and
a read control unit for controlling the reading of the contents of said operating database by said database reading unit on the basis of said request quantity information read out by said request quantity reading unit.

2. The service managing apparatus according to claim 1, wherein said read control unit controls to sequentially change a read quantity of the contents of said operating database by said database reading unit on the basis of said request quantity information.

3. The service managing apparatus according to claim 2, having a read information quantity table in which a quantity of information to be read out by said database reading unit is set in advance corresponding to said request quantity information, wherein said read control unit sequentially changes a read quantity of the contents of said operating database on the basis of said request quantity information with reference to said read information quantity table.

4. The service managing apparatus according to claim 1, further comprising, a collation excluded data holding unit for holding information relating to contents not to be collated by said collating unit; and a collation controlling unit for controlling said collating unit not to collate the contents held in said collation excluded data holding unit.

5. A method for collating databases for use in a service managing apparatus for managing a state of a service controlling apparatus in an intelligent network, for providing service in response to desired request from an exchange that performs switching process when communications are made between a plurality of terminals, which are adapted to be communicatably connected to the intelligent network, said service managing apparatus having a subscriber database holding subscriber data for the service provided by said service controlling apparatus, said method, in order to check the matching of an operating database for service operation in said service controlling apparatus and a subscriber database in said service managing aqparatus comprising the steps of:

a request quantity reading step of reading the quantity of requests for service supply from said exchange held by said service controlling apparatus;

a read quantity deciding step of deciding a read quantity of contents of said operating database on the basis of said request quantity information read out at said request quantity reading step;

a database reading step of reading the contents of said operating database possessed by said service controlling apparatus on the basis of the read quantity decided at said read quantity deciding step; and a collating step of collating the contents of said operating database read out at said database reading step with contents in a corresponding region of said subscriber database.

6. A computer readable recording medium in which a database collating program is recorded characterized in that when databases are collated in a service managing computer having a subscriber database holding subscriber data for services provided by a service controlling apparatus to manage a state of said service controlling apparatus in an intelligent network, providing the service in response to desired request from an exchange that performs switching process when communications are made between a plurality of terminals, which are adapted to be commicatably connected to the intelligent network, said database collating program, in order to check the matching of an operating database in said service controlling apparatus and said subscriber database in said service managing apparatus, makes said service managing computer function as a request quantity reading means for reading the quantity of requests for service supply from said exchange held by said service controlling apparatus;

a read quantity deciding means for deciding a read quantity of contents of said operating database on the basis of said request quantity information read out by said request quantity reading means;

a database reading means for reading the contents of said operating database possessed by said service controlling apparatus on the basis of the a read quantity decided by said read quantity deciding means; and a collating means for collating the contents of said operating database read out by said database reading means with contents in a corresponding region of said subscriber database.

\* \* \* \* \*